(12) United States Patent
Ruiz et al.

(10) Patent No.: US 9,471,439 B2
(45) Date of Patent: Oct. 18, 2016

(54) SYSTEMS AND METHODS FOR REDUCING LOAD DATABASE TIME

(71) Applicants: Carlos Ruiz, Madrid (ES); Graham Ivey, Hampshire (GB)

(72) Inventors: Carlos Ruiz, Madrid (ES); Graham Ivey, Hampshire (GB)

(73) Assignee: SYBASE, INC., Dublin, CA (US)

( * ) Notice: Subject to any disclaimer, the term of this patent is extended or adjusted under 35 U.S.C. 154(b) by 362 days.

(21) Appl. No.: 14/210,125

(22) Filed: Mar. 13, 2014

(65) Prior Publication Data

US 2015/0261620 A1    Sep. 17, 2015

(51) Int. Cl.
  *G06F 17/30* (2006.01)
  *G06F 11/14* (2006.01)

(52) U.S. Cl.
CPC ....... *G06F 11/1458* (2013.01); *G06F 11/1451* (2013.01); *G06F 11/1461* (2013.01); *G06F 11/1466* (2013.01); *G06F 11/1469* (2013.01); *G06F 17/30368* (2013.01); *G06F 2201/80* (2013.01); *G06F 2201/81* (2013.01); *G06F 2201/84* (2013.01)

(58) Field of Classification Search
CPC .......... G06F 17/30286; G06F 17/30368; G06F 17/30315; G06F 11/1458; G06F 11/1451; G06F 11/1466; G06F 11/1469; G06F 11/1461
USPC ................. 707/649, 672, 640, 648
See application file for complete search history.

(56) References Cited

U.S. PATENT DOCUMENTS

| | | | | |
|---|---|---|---|---|
| 5,455,946 A * | 10/1995 | Mohan | ................ | G06F 11/1451 |
| 5,515,502 A * | 5/1996 | Wood | ................ | G06F 11/1456 707/999.202 |
| 5,671,350 A * | 9/1997 | Wood | ................ | G06F 11/1456 714/15 |
| 5,832,508 A * | 11/1998 | Sherman | ............ | G06F 17/30368 |
| 6,052,797 A | 4/2000 | Ofek et al. | | |
| 7,277,905 B2 * | 10/2007 | Randal | ............... | G06F 17/30315 707/648 |
| 7,587,429 B2 * | 9/2009 | Liedes | ................ | G06F 11/1471 |
| 8,364,648 B1 * | 1/2013 | Sim-Tang | ......... | G06F 17/30368 707/674 |
| 8,433,684 B2 * | 4/2013 | Ruiz Munoz | ....... | G06F 11/1458 707/649 |
| 8,712,970 B1 * | 4/2014 | Sim-Tang | ......... | G06F 17/30286 707/672 |
| 2002/0116404 A1 * | 8/2002 | Cha | ..................... | G06F 11/1471 |
| 2003/0041075 A1 | 2/2003 | Frank et al. | | |
| 2006/0004860 A1 * | 1/2006 | Liedes | ................ | G06F 11/1471 |
| 2011/0246425 A1 * | 10/2011 | Munoz | ................ | G06F 11/1458 707/640 |

OTHER PUBLICATIONS

"European Application Serial No. 14004162.5, Search Report mailed Aug. 5, 2015", 9 pgs.

* cited by examiner

*Primary Examiner* — Jean M Corrielus
(74) *Attorney, Agent, or Firm* — Schwegman Lundberg & Woessner, P.A.

(57) ABSTRACT

Systems and methods are presented for reducing load database time in a database backup process. In some embodiments, a computer-implemented method may include marking a checkpoint in a log of the database; generating a backup of the database for data up to the checkpoint; recording first changes in the database while generating the backup of the database; adding to the backup of the database an additional backup of the recording of the first changes; recording second changes in the database while adding the additional backup; determining if a number of second changes satisfies a criterion; and if the number of second changes satisfies the criterion, then adding to the backup of the database a backup of the recorded second changes. Recording these changes can enable a database dump process to contain more recent page images, so that the amount of recovery at load time is reduced.

17 Claims, 6 Drawing Sheets

- Mark the database as being dumped

- Checkpoint to flush all dirty pages and get the beginning of the log plus the oldest active transaction at the time of the checkpoint.

- Store the checkpoint record and write it to the dump.

- Start the Dump Flush List Manager and ensure all unlogged updaters register their changed pages with DFL.

- Flush all dirty allocation pages to disk

- Proceed with the DBPAGES phase. Unlogged updaters register with DFL whose pages are periodically sent to the backup server using the secondary connection.

- Block flushers. Any unlogged update after this point will first sleep, and when flushers get unblocked, they will be discarded.

- Proceed with the FLUSHPAGES phase. Any remaining unlogged updates recorded in the DFL list will be sent to the backup server.

- Set the dump instant, or, in other words, the end of the active portion of log.

- Stop recording unlogged updates in the DFL.

- Wake up the flushers that were blocked. Purge pending updates.

- Flush syslogs.

- Proceed with the SCANLOGPAGES phase to send the active portion of the log.

- Write the dump trailer

- Mark the database as no longer in a dump

- Mark the database as being dumped

- If optimize dump for faster load is enabled
  Allocate DPM arrays

- Checkpoint to flush all dirty pages and get the beginning of the log plus the oldest active transaction at the time of the checkpoint. If this is the first iteration loop, start recording page updates (DBTX_OPTIMIZE is set and DBTX_OPTIMIZE_READY is removed). If it is not the first, the active and inactive bitmaps are swapped.

- Store the checkpoint record and write it to the dump.

- Start the Dump Flush List Manager and ensure all unlogged updaters register their changed pages with DFL.

- Flush all dirty allocation pages to disk

- Proceed with the DBPAGES phase. Unlogged updaters register with DFL whose pages are periodically sent to the backup server using the secondary connection.

- If DBTX_OPTIMIZE is set, send updates to the backup server

- Block flushers. Any unlogged update after this point will first sleep, and when flushers get unblocked, they will be discarded.

- Proceed with the FLUSHPAGES phase. Any remaining unlogged updates recorded in the DFL list will be sent to the backup server.

- Set the dump instant, or, in other words, the end of the active portion of log.

- Stop recording unlogged updates in the DFL.

- Wake up the flushers that were blocked. Purge pending updates.

- Flush syslogs.

- Proceed with the SCANLOGPAGES phase to send the active portion of the log.

- Write the dump trailer

- Mark the database as no longer in a dump.

SYSTEMS AND METHODS FOR REDUCING LOAD DATABASE TIME

CROSS REFERENCES TO RELATED APPLICATIONS

This application is related to U.S. Pat. Nos. 5,515,502 and 8,433,684, the disclosures of which are incorporated herein by reference in their entirety and for all purposes.

TECHNICAL FIELD

The subject matter disclosed herein generally relates to the processing of data. In some example embodiments, the present disclosures relate to systems and methods for reducing load database time.

BACKGROUND

In the computer industry, it has long been recognized that data stored within a computer system's mass storage substructure, such as a hard disk drive, should be "backed up," meaning a copy of the data is made on a regular basis, in order to prevent the loss of that data should the computer system malfunction, "crash" or otherwise become inoperative or unavailable. Early in the field of database systems, data files were stored on magnetic hard disks, providing relatively fast random access, and were then regularly backed up to magnetic tapes, a medium which provides slower sequential access but which can be used to store data densely and inexpensively. These removable magnetic tapes permit archived data to be moved to another location for safekeeping or for later loading to a different computer system. In some cases, the process of backing up a database may be referred to as dumping the database or a database dump. The process of recovering the database from a backup copy may be referred to as loading the database or a database load. In some cases, a database backup may include a creating a backup copy of the entire database, which may be referred to as performing a full database backup. In other cases, a database backup may include creating a backup copy only of the changed or modified pages since the last backup, which may be referred to as performing a cumulative backup.

Traditionally, such backups have been performed on a regularly scheduled basis, with separate archives being created, for example, monthly, weekly, daily or even hourly. However, the timing of such backups has had to be coordinated with the actual usage of the computer system being backed up, since traditional backup methods required that a backup cannot be performed at the same time that the computer system is also being used for data processing.

When computer database programs were designed for operating primarily in a batch processing mode, on a large mainframe computer, such backups were readily scheduled and easily performed, since users did not enjoy a continuous interactive involvement with the computer system. However, with the development of time sharing systems and other "transactional" database systems, including those found on personal computers, users now expect to interact with computer systems "on-line" and in real time, creating procedural difficulties for the process of backing up data. Some of these difficulties arise from the fact that in order to back up a database or other information stored in a computer system, and particularly when the data to be backed up is of a transactional nature, data should not change or be modified at some point in time just prior to performing the backup in order to maintain the integrity of the database and eliminate the possibility of losing data which may change during backup.

Simple solutions to resolving this problem include preventing access to the database while it is being backed up. However, such a technique may be disadvantageous to the user because the user is unable to access the database while it is being backed up, effectively taking the database "off line" and creating an inconvenience, which may be inefficient. Such a technique may also create problems regarding data integrity when, for example, a transaction is in progress but has not yet been committed to the database when a backup begins.

Current database backup techniques may be fully online, meaning that a user may still have full access to the database while a backup is being performed.

In at least some cases, part of the process for performing a database dump (both full and cumulative) includes the database being checkpointed, meaning a marker is placed in the database that records a timestamp such that any changes made to the database thereafter are not intended to be recorded by the initial database dump. Next, pages may be copied from the database to the archive by backup server. During the time when pages are being copied, changes may continue to be made to the database by concurrent processes, including users modifying pages of the database. When these pages are copied from the archive to the database by load, the pages have an image at least that of the database when it was checkpointed, but the changes subsequent to this may be (and are likely to be) missing. In some cases, these changes are restored when loading the database by having copying the transaction log of the database to the archive and then using the changes recorded in the transaction log to restore the database to the state that it was at the dump instant.

The longer it takes for pages to be copied from the database to the archive, and the more concurrent activity there is during this time, the larger the amount of recovery the load must perform. For very active very large databases (VLDBs), the time that it takes to recover a database is considerable, and thus the time taken to copy pages from the archive to the database becomes only a fraction of the total restore time.

BRIEF DESCRIPTION OF THE DRAWINGS

Some embodiments are illustrated by way of example and not limitation in the figures of the accompanying drawings.

FIG. 6 is a block diagram illustrating components of a machine, according to some example embodiments, able to

DETAILED DESCRIPTION

Example methods, apparatuses and systems are presented for reducing time in restoring a database from a backup.

Definitions

Non-limiting definitions are presented herein for purposes of illustration and in order to assist with an understanding of the present disclosures.

Logical Page—The smallest addressable unit of logical storage within a database. This is a contiguous block of 1, 2, 4, or 8 virtual pages. Each logical page has a 4-byte unsigned integer ID in the range of 0 through 4,294,967,295 that describes its location within a database's disk map. Each database contains a collection of logical pages whose IDs form an unbroken series from 0 through [number of logical pages in the database, minus 1], grouped into collections of allocation units.

Virtual Page—the smallest unit of storage that may be read or written by a DBMS I/O engine. Each virtual page is described by an integer device ID and an offset into that device, where the offset is expressed as a number of virtual pages. (That is, offset 0 is the absolute beginning of that device, whereas offset 1 begins at byte offset [1*size-of-virtual-page].)

RID or Row ID—The address of a row in a database composed by a logical page ID and a row number within the page.

Runlist—A group of consecutive pages described by pairs containing the first page in the chunk and the number of pages that follow.

Allocation Page—The first page of the minimal database disk allocation unit. It contains a map of pages allocated and the objects they are allocated to.

Allocation Unit—A group of consecutive pages controlled by an allocation page. The size of an allocation unit is 255 pages plus the allocation page itself.

Incremental backup—A backup of all the pages that have changed since a point in time.

Cumulative backup—A type of incremental backup that is a backup of all the pages that have changed since the last full database backup.

Differential or delta backup—A type of incremental backup that is a backup of all the pages the pages that have changed since any previous backup.

Dump sequence—A group of database dumps required to bring the database to the state it had at the time the last dump in the sequence was taken.

Transaction dump—A copy of the log records that represent the changes that have happened in the database since the last dump was taken. It is a differential dump that contains, instead of the data changes, a record of the operations that would result in those data changes if reapplied.

Full database dump—A copy of the database at the dump instant.

Dump instant—An instant in time denoted by a row ID in the transaction log to which the image of a database will be brought when the dump is loaded. The dump instant for a full database dump is determined towards the end of the dump process, while the dump instant of a transaction log dump is determined at the beginning of the dump process.

Checkpoint—The process that flushes all dirty pages to disk. After a checkpoint record is written to the transaction log and its RID stored, all the pages dirty prior to this instant will have been flushed to disk.

Dump Allocation Map—Each database has a Dump Allocation Map (DAM). It stores a bitmap for all allocation units of a database that have changed since a previous dump, with 1 bit per allocation unit. When a page in an allocation unit gets modified, its corresponding bit in the DAM is set to 1.

Cumulative Dump Allocation Map (CDAM)—A subset of pages in the Dump Allocation Map that represents the allocation units that changed since the latest full database dump.

Draft Allocation Map (DRFT)—A subset of pages in the Dump Allocation Map that exists only while a full database dump is running. It represents the allocation units that have changed since the current dump started.

Dump Page Map (DPM). A set of bitmaps for the entire database that store page updates since the active dump (full or cumulative) started. Different from the DRFT, it uses a bit per page instead of a bit per allocation page.

Dump Page Map Bitmap (DPM bitmap). A 2K memory page representing a set of contiguous pages that have been changed since the active database dump (full or cumulative) started.

Dump Page Map Array. An array of pointers to DPM bitmaps.

Dump Flush List (DFL). A global structure created while a database dump is running where pages that are modified without a log record that describes the change, are registered. The list is used to ensure that the contents of pages changed by unlogged operations are stored in the dump, thereby obviating the need for a log record to recover the contents at load time.

Example methods, apparatuses and systems are presented for reducing time in restoring a database from a backup. Examples described herein merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Aspects of the present disclosures can reduce the amount of recovery that is done during a load, thereby reducing the time overall to restore a database. Further details describing this problem and how the present disclosures reduce database load time will be described in more detail, below.

Figure 1:
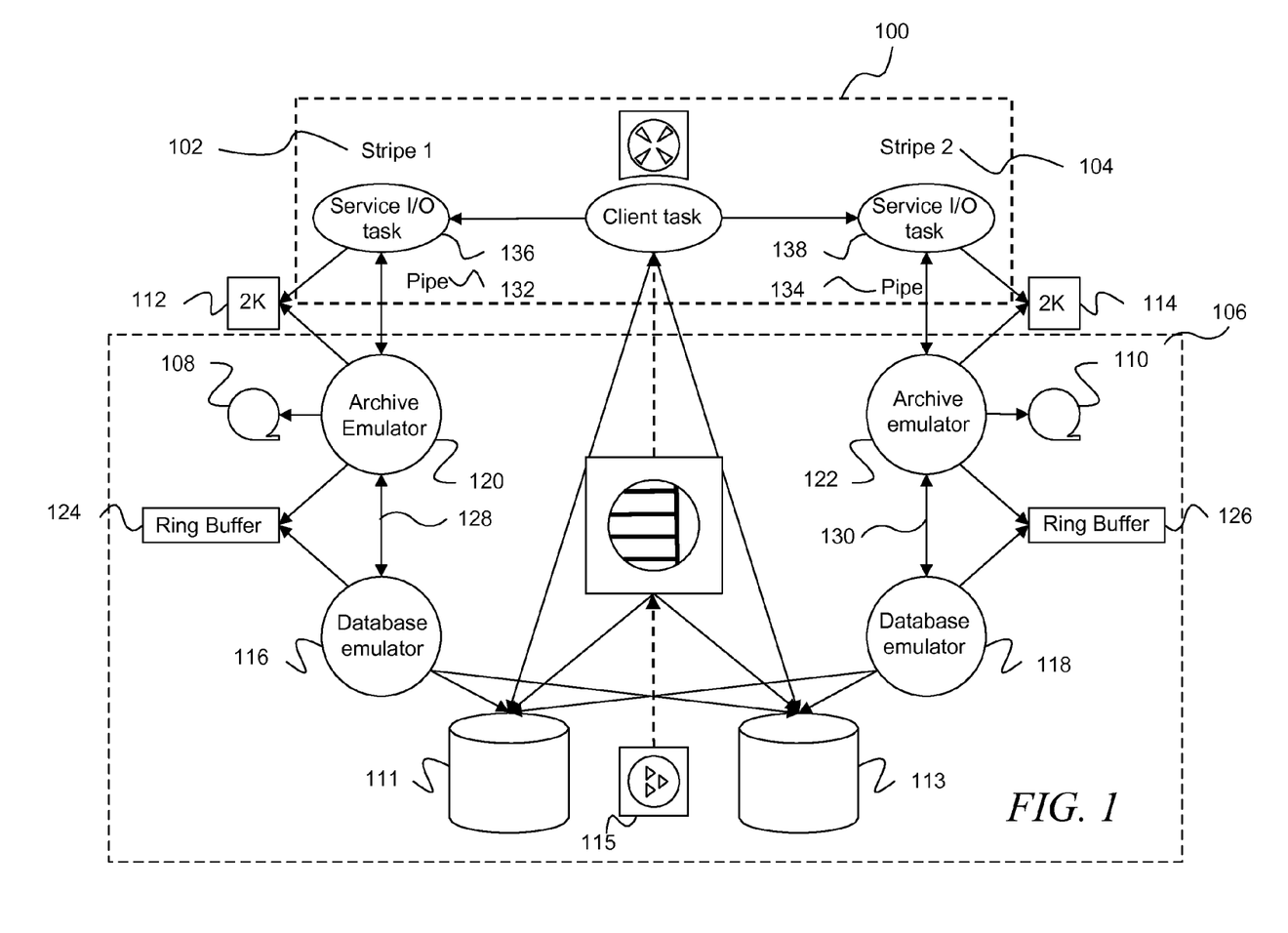
FIG. 1 is a database design architecture suitable for performing a database backup, according to some example embodiments.

Referring to FIG. 1, an example schema of a database architecture configured to perform an online database back up from a database server 106 to a backup server 100 is shown, according to some embodiments. In some example embodiments, the database architecture in FIG. 1 can perform the methods for reducing load database time, as described herein. In this example, two stripes 102, 104, are shown for a DUMP/LOAD model for a disk-resident database. As used herein, a stripe may refer to a segment of sequential data written to or read from a disk that may be interleaved with other stripes stored in one or more additional disks to form a complete logical sequence of data. Stripes may be used in a data storage technique called data striping, which segments a logical sequence of data, such as a file, into consecutive segments that are stored on different physical storage devices. Striping can be useful when requests for data are quicker than a single storage device can provide it. In order to create a recoverable dump, a synchronization protocol may be implemented to coordinate the database server 106 and backup server 100. This may be achieved through phases and a stripe affinity mechanism, an example implementation of which may be described in FIG. 2.

Information about each runlist may be dumped to the archive devices 108, 110 (e.g., tape drives, optical drives, etc.). In a disk-resident 111, 113 database 115, the backup server 100 may allocate its own set of local buffers (e.g., 2K buffers 112, 114), for example, one per allocation page, when performing a recoverable dump. Backup server 100 also spawns emulators per stripe (assuming a local dump; a remote dump may utilize a single emulator). These may be database emulators 116, 118 and archive emulators 120, 122. An emulator may include hardware or software or combination thereof that duplicates the functions of one computer system in another computer system.

During a dump operation, the database emulators 116, 118 may read database pages into one of the shared memory buffers 124, 126. During a load operation, database pages may be written from one of the buffers 124, 126. The archive emulators 120, 122 may interact with the archive devices 108, 110. During a dump operation, pages may be written to the archive devices 108, 110 from one of the shared memory buffers 124, 126. During a load operation, data pages may be read from archive devices 108, 110 into shared memory buffers 124, 126. The emulators may communicate with each other via pipes 128, 130. The pipes may be used to synchronize I/O operations. The archive emulators 120, 122 may communicate with backup server 100 via another set of pipes 132, 134, also referred to as the job queue. The I/O service tasks 136, 138 may issue jobs to the archive emulators 120, 122 by placing a job request in the pipes 132, 134. The archive emulators 120, 122 may acknowledge the results of that request through the same pipes 132, 134. The dump operations and load operations described herein may be modified according to techniques of the present disclosures, described more below, in order to reduce load database time.

In addition, a shared memory segment may be shared between backup servers and the emulators. This shared buffer may be used to hold label blocks for when header/trailer labels are read or written to the archive device.

Figure 2:
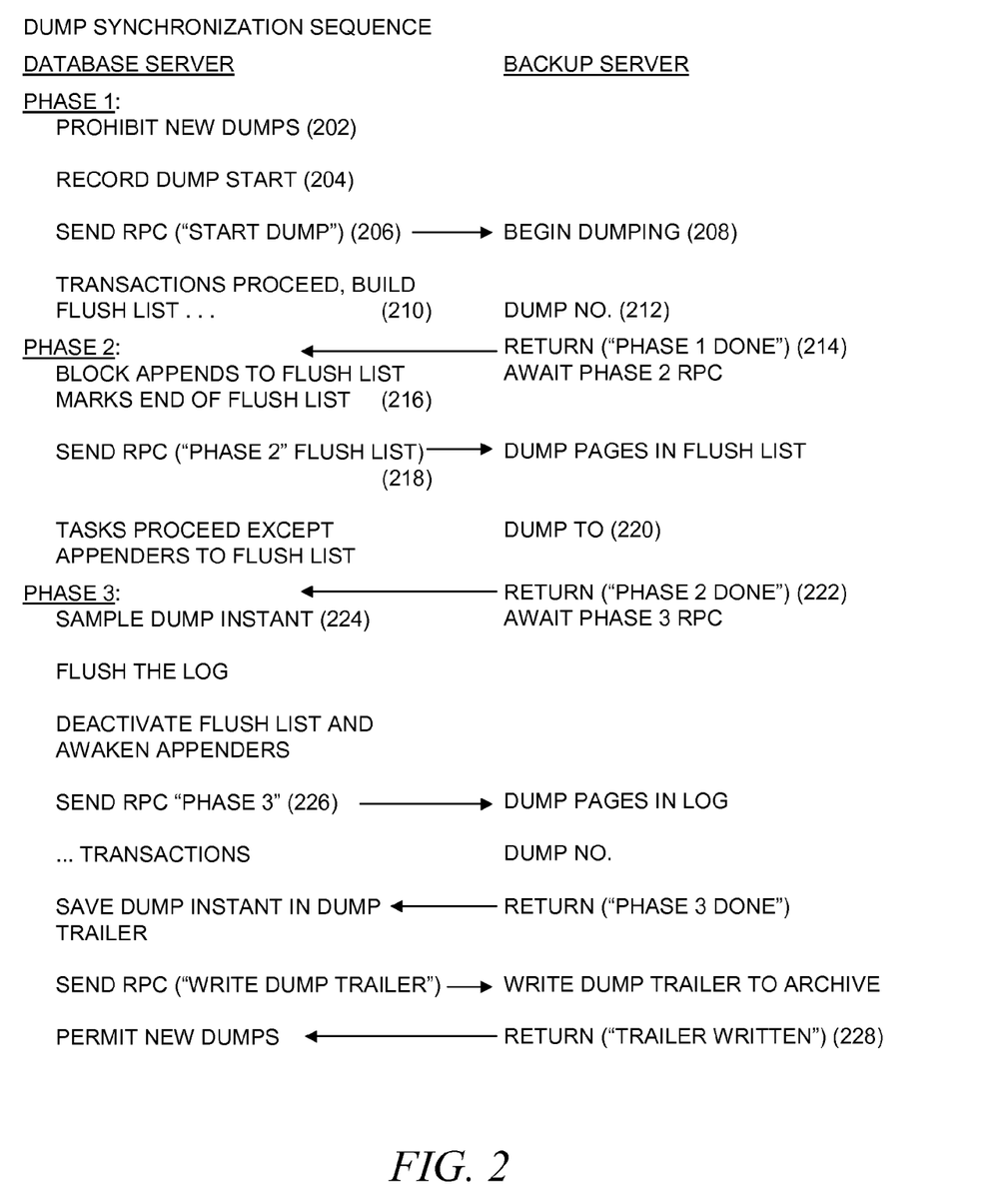
FIG. 2 is a chart illustrating example steps for performing a standard database backup, according to some example embodiments.

Referring to FIG. 2, an example process flow of an online database dump using known means is shown. Here, this example process flow completes a database dump in three phases.

In this example, in Phase 1, a user may initiate a request to dump an image of the database to an archive device. The database server blocks the initiation of any other dumps of the target database at step 202 and records a dump start log RID (row identifier) at step 204. After recording the dump start log RID, the database server signals the backup server to begin dumping at step 206. At this point, the backup server begins its dump at step 208, utilizing the fully available I/O bandwidth. A flush list is also built at this point, at step 210. When this initial Phase 1 dump is completed, the backup server signals the database server that Phase 1 of the dump is completed thereby creating a baseline dump of all the pages to be recorded in the backup database, at step 214.

It should be noted that the backup system can operate in a transactional database environment where database pages, which have already been backed up during some part of Phase 1, are updated, but which may have then changed without a corresponding log record, while another part of the Phase 1 backup was in effect. This rewriting of information may take place during Phase 2, during which pages that have been changed without logging since the time the dump started are dumped again. As noted, these pages are dumped again because an allocation to a transaction tracking log or a page split that takes place during Phase 1, but after the corresponding allocation unit has been dumped, would not otherwise be recoverable. Under this architecture, it is sufficient to re-dump only those pages that have changed, because those pages will contain information created later in time and will therefore overwrite any earlier recorded data with more current data during a restoration session. A useful way to perform this task without limiting the throughput during Phase 2 is to keep track of all physical changes made to the database that cannot be completely recovered from log information. These physical changes include, but are not limited to, for example, page splits from B-tree index updates and new pages generated by index creation. During Phase 1, the database server may maintain a list of pages allocated for these purposes, and this list is known as a flush list, mentioned in step 216.

Still referring to FIG. 2, in this example, at the beginning of Phase 2, the database server blocks any tasks attempting to add to the flush list before they issue the corresponding log records at step 216. In some cases, one order for performing this is to (1) log the change; (2) flush the page; and (3) add the page number to the flush list. In some cases, without such blocking, those log records could not be redone. In other cases, for transactions that do not have their changes logged, prior to committing the transaction, all pages changed by the transaction for which there is no corresponding log record, should first be flushed to disk and then register the page numbers with the flush list. The database server then determines an end point for the flush list and sends it to the backup server at step 218 while awaiting acknowledgement from the backup server that pages in the flush list have been dumped. The backup server then dumps those pages at step 220 and returns a completion message to the database server at step 222 indicating that Phase 2 has been completed.

Turning next to Phase 3, as can be seen in FIG. 2, in this example, the database server handles the log pages that have been allocated since the start of Phase 1. The records fall between the dump start log RID and the current last record of the log. Other allocations and data are recoverable from this log. The database server captures the current last record of the log (called the dump instant) at step 224 and constructs a list of log pages between the dump start log RID and the dump instant. It ensures that those pages have been written to the database and then sends a list of log pages to the backup server for dumping, at step 226. Finally, the flush list is discarded and deactivated which has the effect of reactivating tasks waiting on the flush list. When the backup server signals the end of Phase 3, the database server permits new dumps once again at step 228.

In some embodiments, not all of the 3 phases are performed. For example, in some embodiments, only Phase 1 (the data phase) and Phase 3 (the log phase) are performed. For example, in a transactional data repository system, such as a database or transactional file system, it may be sufficient to perform an unsynchronized copy of the repository in Phase 1, followed by a synchronized copy of the transaction log in Phase 3 (which would be the second actual phase in this example). As noted, a function of a later phase may be to capture recovery information for most or all the changes that have occurred during or subsequent to an initial phase but prior to a secondary phase. In some embodiments, Phase 2 is performed for flushed pages due to the particular database server design. However, this flushed page concept may not exist in other embodiments and, consequently, a data phase and a log phase alone may suffice.

While the example structures and processes described in FIGS. 1 and 2 complete database dumps successfully, the time taken to perform such a task may be inefficient. For example, the number and size of log records in the transaction log may define the time recovery takes to bring the database online. For example, on very large databases, many changes to database pages may occur while the dump process is ongoing. Thus, any changes to pages modified after the database is checkpointed should still be preserved somehow. Previous methods to accomplish this involved applying to the pages, changes made based on the log records between the checkpoint and the dump instant. This recovery process may be too slow and cumbersome as it may occur during the load database operation. Thus, modifications to known methods, according to some example embodiments, may be useful to reduce the load database time.

In some examples embodiments, the corresponding dump keeps track of the one or more pages that are changed by concurrent activity in a list while the pages are being copied from the database to the archive. Effectively, the pages in the list may be copied again from the database to the archive, a process that takes less time than the original full copy. Re-copying the actual pages that have been changed may also be quicker than previous methods, such as recovering the pages based on the changes in the log. Because it takes less time, the number of pages that are changed by concurrent activity is reduced. This process can be repeated; copying later images of pages to the archive while reducing the period in which concurrent activity can make yet further changes. The net result is that at load time, there are more page images to load (a relatively quick operation that can be parallelized using multiple stripes), but much less recovery to do (a relatively slow operation that is performed serially), thereby improving the performance of the load.

In some example embodiments, the recovery time during database load may be reduced at the expense of increasing the amount of time taken to perform a database dump, because of the additional page copying that occurs at that time. Because of this, in these cases, a configuration parameter, for example an 'optimize dump for faster load' parameter, may be used to enable and disable reduced load recovery.

When set to 0, the optimization does not apply and processes to back up the database proceed as before. For example, functions such as DUMP DATABASE and LOAD DATABASE, which may be used to perform a database dump to the archive and load from the archive, may proceed as before.

In some embodiments, this configuration parameter value may represent a threshold percentage of the database. When set to a value greater than 0, accordingly to some example embodiments, optimization may be implemented by having DUMP DATABASE re-copy any changed pages that have been changed while copying pages to the archive. Pages are re-copied provided the percentage of changed pages relative to the number of used pages (excluding log pages), in the database is, for example, greater than the configuration parameter (in this case representing a percentage, or in other cases representing a percentage×100, for example). The process of re-copying pages is done iteratively with the first iteration taking place after the full database has been copied to the archive. In some embodiments, the next iteration proceeds if the criterion for re-copying is satisfied. For example, the criterion may be satisfied if the percentage of pages changed or modified in the database has exceeded the threshold percentage value represented by the configuration parameter. For example, the criterion may be satisfied if the percentage of pages changed or modified in the database is equal to the threshold percentage value represented by the configuration parameter. In another example, the criterion may be satisfied if the percentage of pages not changed or not modified in the database is below the threshold percentage value represented by the configuration parameter. In some embodiments, the dump may be limited to a maximum of three iterations to prevent the situation that there is more than the configured number of pages that have been changed, in which case DUMP DATABASE would not complete.

In some embodiments, an example implementation includes the maintenance of a bitmap of changed pages, called the dump page map (DPM). The DPM is activated at the time of DUMP DATABASE's checkpoint. It is known that pages that are meant to go into the dump (e.g., all pages for a FULL dump and a subset of pages for a CUMULATIVE dump), should make it into the database dump. However, any page that changes after the checkpoint—one that might normally need to be recovered using log records during LOAD DATABASE—is registered in the DPM. When the first phase has completed, DUMP DATABASE evaluates whether the number of changed pages is more than the configuration parameter of used pages in the database (per the optimize dump for faster load configuration parameter). If it is, then in some example embodiments, DUMP DATABASE enters the first of possible 3 iterations. Each iteration may perform an identical process as follows:

Checkpoint the database during which time a fresh dump map becomes the active dump map. That is, the dump map that was populated during the previous cycle now contains the list of changed pages in that cycle, and a new cycle begins using a new dump map.

Checkpoint will have a new oldest active transaction which will become the new start of the recoverable log for LOAD DATABASE. This new checkpoint is recorded in the dump trailer. It is not possible to overwrite the original in the dump header as the dump has advanced beyond that point. LOAD DATABASE will use any checkpoint information in the trailer first, in order to establish the recovery boundaries.

Derive run lists using the populated dump map and have backup server copy these pages to the archive.

Re-evaluate whether to start a new iteration. A determination may be based on whether the amount of pages changed during the present iteration exceeds some predetermined threshold, such as the percentage of changed pages exceeds the configuration parameter percentage.

If the maximum 3 iterations (after the initial first phase) have been run, or the condition to start a new iteration is not upheld, then the dump can move onto the second phase.

Recording these changes may enable the database dump process to contain more recent page images than through existing methods, so that the amount of recovery at load time is reduced. In other embodiments, the maximum number of iterations can change, and three iterations is merely one example. In some embodiments, the dump map only stores pages that are changed as a result of logged operations. The dump flush list manager continues to handle pages that have been updated as a result of non-logged operations.

Figure 3:
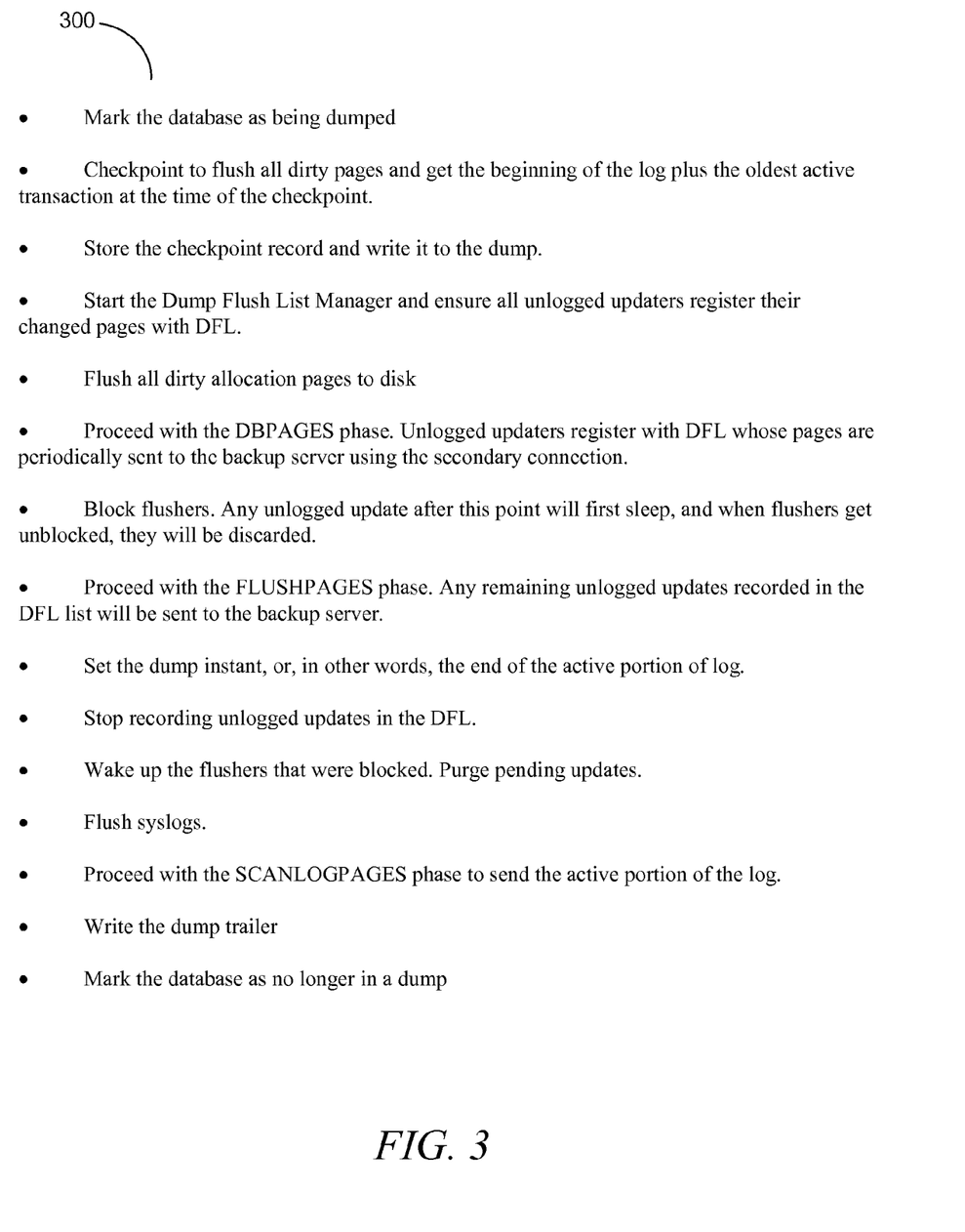
FIG. 3 is another chart illustrating example steps for performing a standard database backup, according to some example embodiments.
Figure 4:
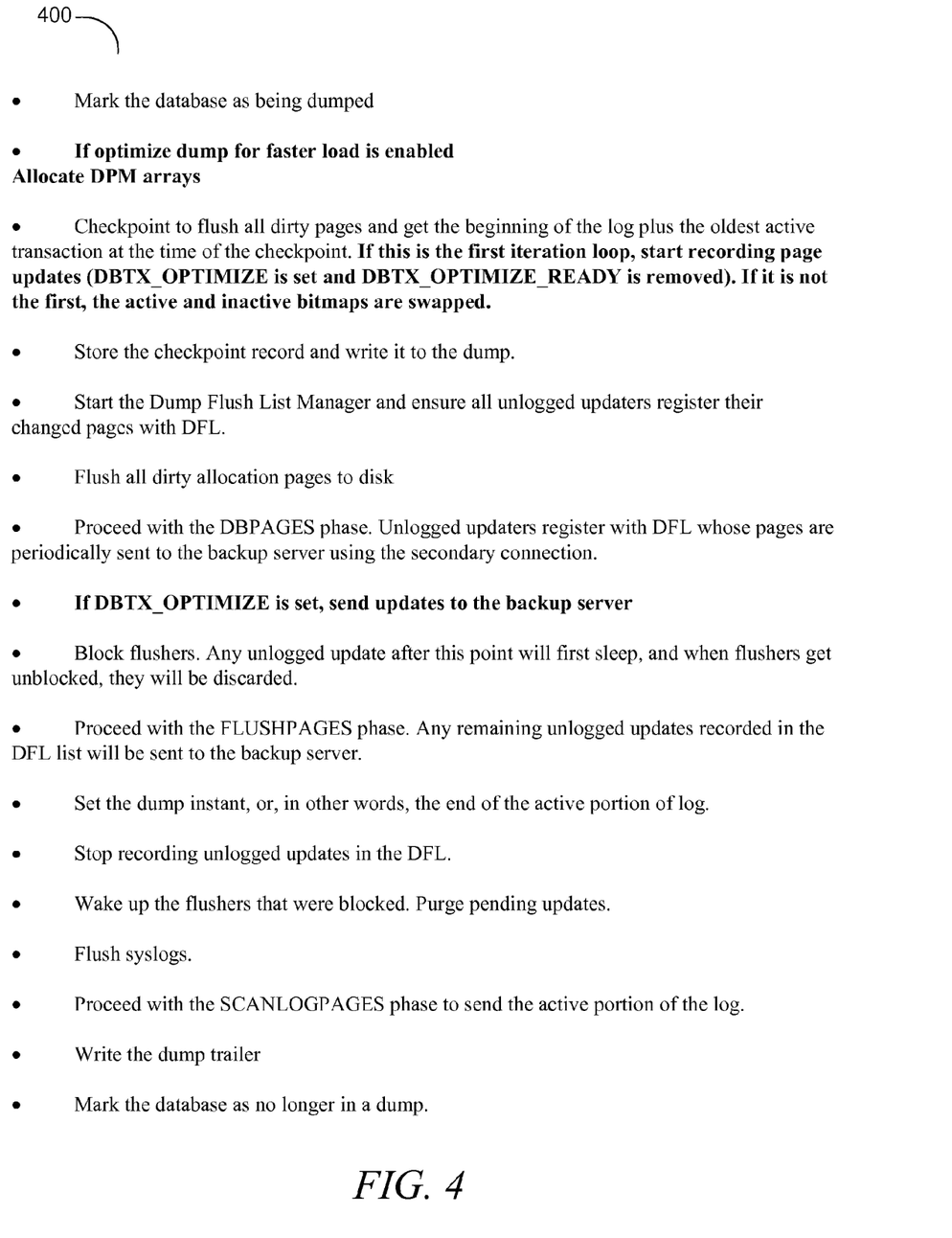
FIG. 4 is a chart illustrating example steps for performing a database backup with reduced load time, according to some example embodiments.

Referring to FIG. 3, for purposes of illustration, an example database dump using traditional steps is shown in chart 300. These steps may be consistent with the steps described in FIG. 2. However, in order to reduce database load time, for example in the case that the database is very big and there is high concurrent transactional activity in the database, the phase 3 can be very long as well, and this will impact the time it takes to recover the database. Thus, referring to FIG. 4, chart 400 shows an example modification to database dump process, according to aspects of the present disclosures. The example modifications in chart 400, shown in bolded text, may represent example function calls that perform the functions described in the previous paragraphs. Chart 400 may illustrate an iteration according to the present disclosures. Multiple iterations may occur, for example, if it is determined that the number of pages changed during the dump process exceeds a threshold criterion. For example, if the number of pages changed exceeds the configuration parameter, then another iteration may be performed. In some cases, the process may perform up to a maximum number of iterations, such as three. In other cases, embodiments are not so limited. Chart 400 may illustrate merely the context in which the modifications may be performed, and is just one of many examples. Those with skill in the art would readily ascertain the various ways in which the present disclosures may be implemented.

In general, the iterative process of the present disclosures described herein may be performed by various database architectures, including, for example, the database architecture described in FIG. 1. Other variations may be readily ascertainable according to those with skill in the art. It may also be apparent that the processes described in FIGS. 2, 3, and 4 may be performed by the database architecture described in FIG. 1 or other variants apparent to those with skill in the art.

Figure 5:
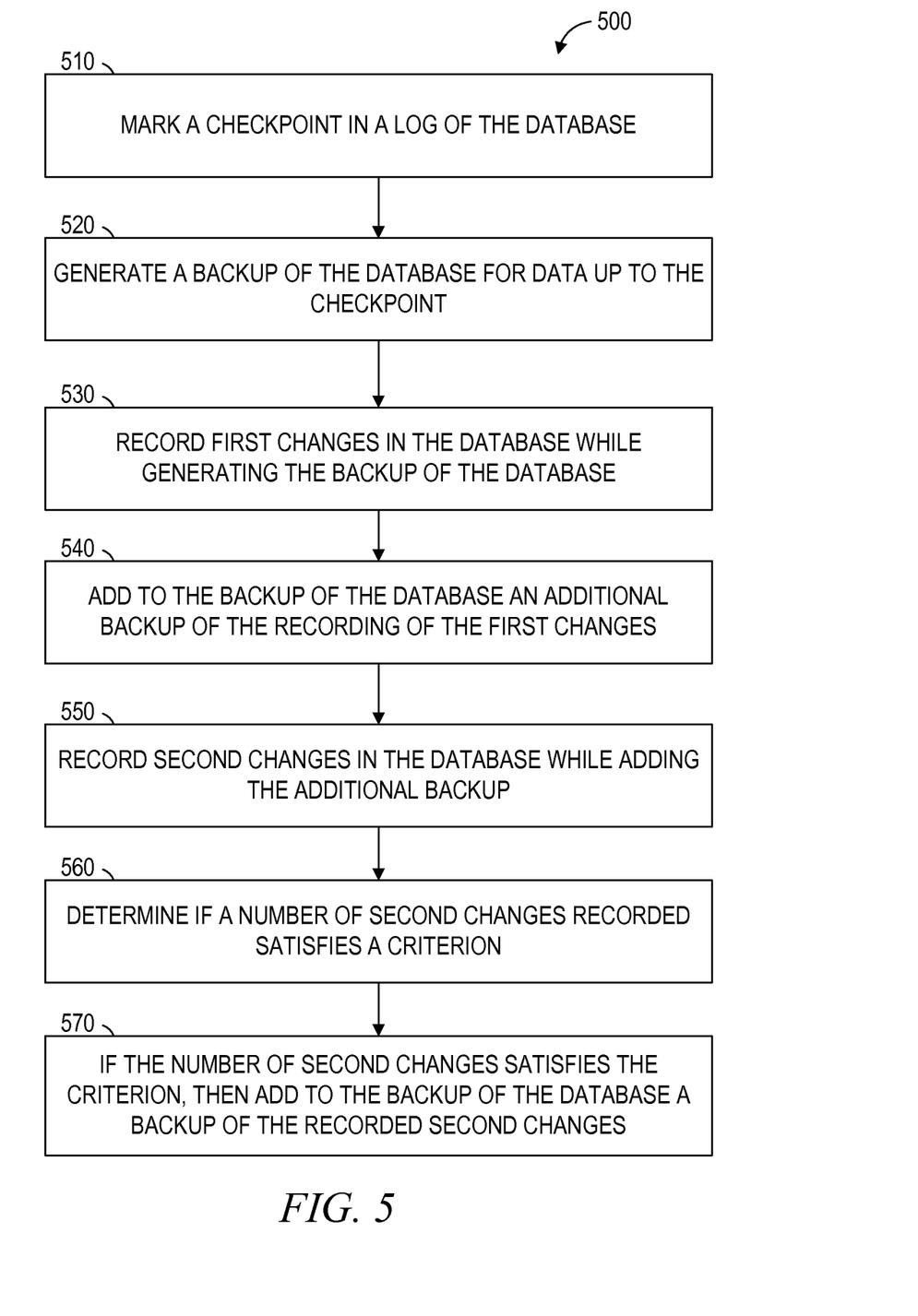
FIG. 5 is a flowchart illustrating example operations for performing a database backup with reduced load time, according to some example embodiments.

Referring to FIG. 5, flowchart 500 illustrates an example methodology for reducing database load time, according to some embodiments. The example methodology 500 may be a more generalized description of the example processes described in FIGS. 1, 2, 3, and 4, and thus the processes previously described may be consistent with those illustrated in FIG. 5. Flowchart 500 may include one or more of operations 510, 520, 530, 540, 550, 560, and 570. One or more of operations 510-570 may be performed as part (e.g., a precursor task, a subroutine, or a portion) of operations discussed in FIGS. 1, 2, 3, and/or 4. The example flowchart 500 may be implemented and performed by one or more devices, including, for example, one or more servers (e.g., database server 106 and/or backup server 100). These example method steps may be consistent with and/or substeps or sub-routines of the steps described in FIGS. 1, 2, 3, and/or 4 and the various disclosures herein.

At block 510, in some embodiments, the method includes marking a checkpoint in a log of a database. The checkpoint may represent a point in the database up to which a backup of the database may be recorded. The checkpoint may be consistent with the checkpoints described in the disclosures herein.

At block 520, the method may include generating a backup of the database for data up to the checkpoint. This process may include a process described in the present disclosures, for example, in FIGS. 2 and 3. While this backup is being generated, multiple changes to the database may continue to occur, that are not recorded in the backup process in step 520.

At block 530, first changes are recorded in the database while generating the backup of the database. Again, while the backup is being recorded, multiple changes to the database that occur would still need to be prepared for a second backup, and thus the concurrent changes may be recorded. In some cases, these changes are recorded in a dump flush list, which is described more below. In some cases, at this step, actual pages that have changed may be recorded, rather than the changes to a page being recorded in the log. As previously mentioned, recording the actual changed pages during the dump process may reduce time when recovering the database during loading of the database, since recovering pages through the log may be a slower process relative to re-copying pages to, for example, the dump flush list.

At block 540, the method may include adding to the backup of the database an additional backup of the database the recording of the first changes. In other words, any changes made during the backup process in 520 may now be backed up as well. Generally, the process in step 540 should take less time than the initial backup process in 520, and this time may be further reduced by re-copying the actual changed pages rather than recovering pages based on changes recorded in the log.

At block 550, the method may include recording second changes in the database while adding the additional backup. In other words, the backup process in step 540 still takes some time to complete, and during this time, additional changes to the database may still occur. These changes should be recorded as well. In some cases, these changes may also be recorded in a dump page map (DPM), described more below, rather than basing changes in the log.

At block 560, the method may include determining if a number of second changes satisfies a threshold criterion. If the second changes to the database made during the first additional backup are numerous and/or substantial (as determined by some criterion), then it may be desirable to perform yet another backup of the latest changes to the database. In some example embodiments, satisfying the criterion may include exceeding the configuration parameter as described herein, where the configuration parameter may represent a percentage threshold of the database.

At block 570, if the number of second changes satisfies the criterion, then the method may include adding to the backup of the database a backup of the recorded second changes. For example, if the configuration parameter is set to 2% of the database, and if it is determined in block 560 that the amount of second changes to the database during the additional backup process in 540 exceeds 2% of the total database, then yet another backup of the database may be recorded, this time to just the pages changed during the first additional backup in step 540, e.g., the second recorded changes in step 550. In some cases, at this step, adding second changes to the backup may include re-copying the changed pages rather than recovering pages based on changes in the log, since re-copying the actual page, even if changed, may be a quicker process than recovering the page based on the log.

In some example embodiments, the process described in steps 550-570 can be repeated a number of iterations. In some example embodiments, the number of iterations may be fixed, for example, up to three times. In other cases, embodiments are not so limited. In some embodiments, at least two database bitmaps may be used to perform the multiple backup iterations. An example utilization of two database bitmaps may be described in more detail, below.

The following non-limiting descriptions illustrate example lower level design details describing methods for reducing load database time, according to some example embodiments. For example, the following may be implemented in various database and backup servers known to those with skill in the art, and embodiments are not so limited. The following are merely for illustration purposes, and those with skill in the art may readily ascertain how the example design details may be expanded, reduced, substituted, translated, and/or modified while remaining consistent with the present disclosures.

Structures

DPM (Dump Page Map)

A structure that may be used to implement the dump page map is as follows:

```
DBT_DPM[i]
 +
 |      DPM ARRAY (One pointer per 64 Alloc units)
 |    +---------+---------+---------+---------+---------+---------+
 +--> |         |         |         |         |         |         |
      +----+----+----+----+----+----+----+----+----+----+----+----+
           |              |              |              |
           v              v              v              v
          nil                           nil
      +----v----+    +----v----+----v----+              +----v----+
      |001000100|    |000001000|110010000|              |111000000|
      |.......  |    |.......  |.......  |              |.......  |
      |         |    |         |         |              |         |
      |         |    |         |         |              |         |
      |         |    |         |         |              |         |
      +---------+    +---------+---------+              +---------+
```

There may be two DPM arrays, the active and the inactive:
  The active array may be the one where concurrent updaters are registering the page modifications.
  In the active DPM, bits may be always set, never reset.
  Before the pages registered in the active DPM may be sent to the backup server, a database server switches them. The active DPM becomes inactive and vice versa. See 'Dump database' below for details.
  Subsequent updates continue in the new active DPM.
  The pages changed in the inactive DPM may be sent to the backup server if the number of updates is above the configured percentage.
  Bits in the inactive DPM may be always reset, never set.
  The DPM arrays may be allocated from the procedure cache when dump starts and released when dump completes.
  The DPM bitmaps may be dynamically allocated on demand from the procedure cache and released together with the dump map arrays.
  A DPM bitmap may be 2 KB memory page, 16384 bits. Every bit represents a database page. Thus, a DPM bitmap may be able to address 16384 pages/256 pages/alloc unit=64 Allocation Units.
  The maximum size of a database may be 2^32 pages=4294967296 pages.
  To address the biggest possible database size, 4294967296/16384=262144 memory pages (2K pages)=512 MB may be allocated. Because of two types of DPMs, up to a maximum of 1 GB may be allocated.
  The maximum size required for one DPM array may be one pointer (8 bytes) for every 2K page: 512M*8/2K=2 MB per type (4 MB for the two of them).

Synchronization

Reading or updating the DPM utilizes two types of synchronization:
  To read and update the DPM arrays
  To read and update the DPM bitmaps Synchronization for the DPM Array When a DPM array is read and/or updated the synchronization may be done using the DPM array lock.

This lock may be used whenever a DPM bitmap is allocated to protect the access to the DPM array. Users read the entry in the DPM array that corresponds to the DPM bitmap for a particular page without holding any lock. If the DPM bitmap is found to be not yet allocated, the allocation routine must get this lock, reread the corresponding DPM array pointer and proceed with the allocation only if it is still NULL.

Synchronization for DPM Bitmap

A DPM bitmap page may be a 2 KB array of aligned integers. The bitmap update may be done using non-locking atomic operations. There may be only concurrent activity in the active bitmaps, and the bits may be always set. This makes the synchronization easy:

```
1  if (bit is not set)
   {
2      (void)ATOMIC_OR(entry, mask);
   }
```

Because bits may be only set in the active bitmaps, the worst that could happen is that between 1 and 2, a concurrent updater has also seen the bit unset, and the same bit would be set twice. As long as there are no concurrent updaters that could reset the bit, this operation can be done this way.

The bitmaps may be reset as the pages that represent may be sent to the backup server. The inactive DPM only has one updater (DUMP DATABASE itself) and occasionally one or more readers, normally some debugging utility. Resetting the bits may be done at integer level when the pages represented by the integer mask are to be sent to the backup server.

The process is simple:
1. copy integer mask
2. set mask to 0
3. Send all pages in the copy of mask DPM Allocation The DPM array may be fully allocated because the biggest possible database would require only 2 MBs per array.

Each page of the DPM bitmaps may be allocated dynamically on demand. When the bit for a changed page needs to be set and the corresponding DPM bitmap is not allocated, the DPM array may lock, allocate the DPM bitmap and release the DPM array lock.

If the allocation failed, the registration of pages may be disabled and all the pages registered so far in the current iteration may be discarded.

The DPM may be deallocated at the end of the dump.

Registering Page Updates

Every update in the system may mark the database buffers as dirty, if they are not dirty already. Whenever a buffer is marked dirty, the corresponding bit may be set in the DPM if needed.

Sending Page Updates to the Backup Server

DUMP DATABASE may proceed as follows:

```
while ((dpms_sent < 3)
   && page registration is enabled
   && If the number of changed pages is >= <percentage>)
  {
    /*
    ** Execute a new checkpoint in order to get all the
    ** pages changed since the dump started flushed to disk
    ** to be copied again by the backup server, and to get
    ** the new oldest active transaction marker that could
    ** reduce the size of the SCANLOGPAGES phase.
    */
    checkpoint( );
    /*
    ** Save the current last checkpoint marker, oldest
    ** active transaction, next object id, . . . in the
    ** archive info structure. It will be copied in the
    ** dump trailer.
    ** We check again if the OPTIMIZE bit is set. If
    ** there has been an error while the checkpoint was
    ** running, we will abort this iteration and the
    ** checkpoint will not be updated in the dump header.
    */
    if (feature has been disable because of an error)
    {
      break;
    }
    /*
    ** If this is for sure the last map we are going
    ** to send, we can stop recording page changes.
    */
    if (we already sent 3 times )
    {
      Stop page registration
    }
    /*
    ** Build runlists from page changes recorded in the
    ** dump map and send them to the Backupserver using
    ** the primary connection.
    */
    Send_DPM( );
/* If no errors happened. */
Fill the dump header with new checkpoint information
  }
  /*
  ** Now that we have got the new checkpoint record, we can
  ** stop recording page updates in the dump map.
  ** Any modifications from now on will be recorded either in
  ** the transaction log or in the dump flush list (that is
  ** about to be blocked as well).
  */
Stop page registration
```

In this process, checkpoint( ) may swap the active/inactive bitmaps. In each iteration, the active bitmaps become inactive and may be sent to the backup server. What was the inactive may then become active and ready for the next iteration. See Checkpoint below.

Active and Inactive Bitmaps

Two different DPMs may be needed because of the multiple iterations that can be gone through when sending updates to the backup server. If there is a lot of activity in the server, and the number of updates is big, the time to send the updated pages can be so long as to have many simultaneous updates that may have to be recorded and sent as well. While this delivery is happening, a frozen view of the updated DPM may be needed, and the concurrent updaters need a fresh DPM to continue registering page updates.

If there was only one DPM, the following erroneous situation could happen during DUMP DATABASE. They may be extended in more detail in the Dump Database section.

```
Enable page registering in DPM (assume for now that this happens before
the checkpoint, although it may not be done this way in all embodiments)
Checkpoint the database
DBPAGES phase
While the number of changed pages is >= percentage
   && not errors
   && number of loops <= 3
   {
     (1) Checkpoint the database and get the new start of the active
   portion of the log
     (2) Send the updated pages registered in the dump map
     (3) Store new checkpoint info in the structure that may be
        copied to the dump trailer.
   }
```

In the first iteration of the loop that sends updated pages it is possible to move the active log start because it is known that all the pages that have been changed may be in the dump, due to having checkpointed the database and then sending the updated pages. But for all the pages that may be changed between 1 and 2, there is no guarantee that, even if they were sent to the backup server, the image of the page the backup server would copy would be the right one, as there is no checkpoint in between.

As an example,

Suppose that the DBMS is processing the first set of pages controlled by the first 4 bytes in the DPM bitmap, from page 0 to 31.

After checkpoint, the bitmap has the bits set for pages 0 and 24.

Also after the checkpoint but before we send the pages, a user updates page 28.

The pages 0, 24 and 28 may be sent and cleared from the bitmap.

Also, suppose that there are no more updates to page 28 and that enough pages have changed during the page delivery to get into the loop again.

Now suppose that the new checkpoint will set the oldest active transaction after the one that modified the page 28 previously, moving the new active log start after this transaction. This means that load recovery may not redo that transaction.

The backup server may be sent the next set of pages and finish the rest of the dump.

In this example, it is quite possible that the backup server has copied an old version of page 28, and because the transaction that changed it is no longer part of the fragment of the log to recover, a corruption may occur in the database.

A solution to this problem may be to have a bitmap for each iteration to record changes done in the database between the last checkpoint and the new checkpoint, e.g., start recording the page updates in a new bitmap as well as to stop recording the updates in the old one during checkpoint, so that, in each iteration loop, the pages in the bitmap which may be sent to the backup server must have been flushed to disk before the bitmap is sent to the backup server. The DPM where the DBMS registers page updates may be called active and the DPM that is sent to the backup server may be inactive.

The time to change the active map into an inactive map and start a new active map may have relevant consequences. Following examples may show that switching at the wrong time may cause database corruption after loading the dump.

For example: Because the very first checkpoint by DUMP DATABASE only marks the beginning of the registration, checkpoint #2 and #3 may be used as the ones that require a map switch.

The checkpoint routine performs the following functions:
Write checkpoint record in the log
Get the latest sequence number in the database and flush the dirty pages up to this point
After the flush is done, the checkpoint record logged earlier may be the official latest checkpoint record
Where to switch the active and inactive bitmaps?
Switching after checkpoint would be an error:
If the bitmap switch is done after the checkpoint completes during DUMP DATABASE, the backup server may copy an old image of a page that is changed during checkpoint.

Checkpoint #2
A committed transaction updates page N which registers it in active map #1 (latest image of page N not flushed by checkpoint #2)
Switch maps
Send map #1 to backup server
Checkpoint #3
(page N is not changed again, so it may not be in bitmap #2)
This checkpoint may flush page N to disk, but page N may not be copied by backup server again because it is not in bitmap #2
Load recovery may use checkpoint #3 as recovery checkpoint. Transaction that changed page N is in phase 1 and may not be redone. This can cause a corruption.

Switch before checkpoint would also be an error:
Here is the scenario that may cause a problem if the bitmaps are switched before starting the checkpoint:

```
Switch maps
Checkpoint #2
{
   A concurrent task executes
   Begin tran T
   Update to N. Maps are switched so this is registered in map #2
   Commit tran T
   Log checkpoint record that may be used as recovery checkpoint
   Page N will be flushed
}
Send map #1 to backup server that does not have N.
```

T is committed in phase 1 according to checkpoint #2, and change to N may not be redone and it would cause a database corruption Switching inside the checkpoint may be the correct option:
The switch of the bitmaps should happen inside of the checkpoint, e.g., after the checkpoint record is written to the log and before dirty pages are flushed to disk:

```
Checkpoint #2
{
   Log checkpoint record to be used as recovery checkpoint
   Concurrent update to N. Update to N may register it in the active bitmap
   #1 and since this happens before the dirty pages are flushed to disk,
   the change to page N may be flushed to disk by this checkpoint
   Latest version of N may be in active bitmap #1
   Switch maps. If done before dirty pages are flushed to disk, it may
ensure
   that any pages made to the active map may be flushed by this checkpoint.
```

```
   The latest image of N may be on disk and the page is registered in bitmap
   #1. After the switch, bitmap #1 may be the inactive one, containing
page
   N, and this may be sent to the backup server.
   Flush all the pages
}
Send map #1 to backup server that contains N
```

In this last example, even if the page N is changed after the buffers are flushed, the page would be in the active bitmap and if the bitmap is sent, the next checkpoint would flush it before sending it to the backup server.

Checkpoint
The checkpoint executed in DUMP DATABASE starts the page registration as well as switching the active and inactive page maps.

```
checkpoint( )
{
   Write a checkpoint log record
   Init the DPM
   Flush all dirty buffers
}
Init the DPM
{
   If this is the first checkpoint
      Start recording page updates
   else
      Switch the maps
}
```

Dump Header and Trailer
The dump header may contain, for example, the RID of the checkpoint record that defines the starting boundary of the database recovery. Because this feature may perform multiple checkpoints, the most recent one may be saved in the dump trailer that is stored at the end of the dump. At load time, the checkpoint RID saved in the trailer may override the one from the header changing the recovery boundaries.

Figure 6:
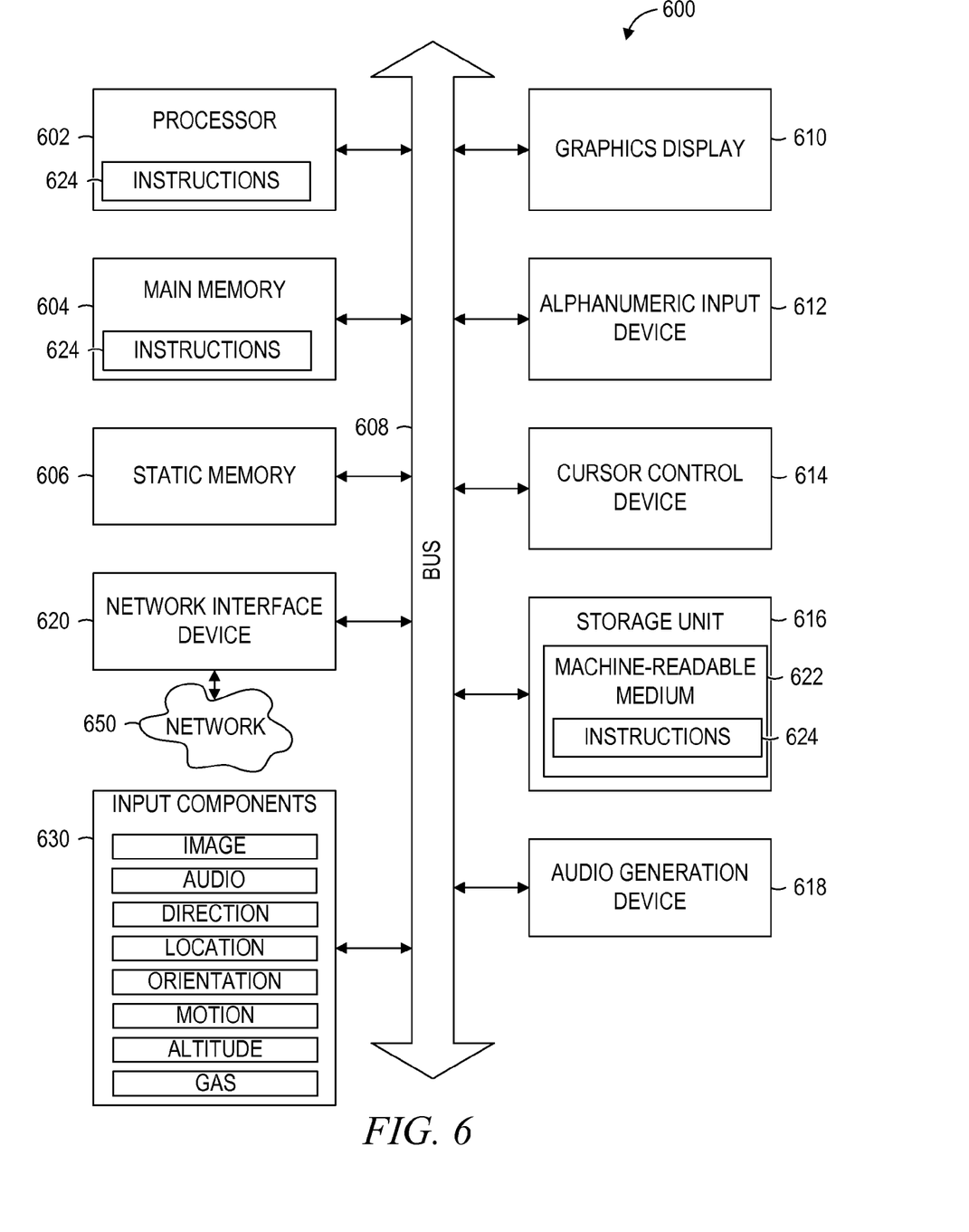

Referring to FIG. 6, block diagram 600 illustrates components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may include hardware, software, or combinations thereof, and may as examples be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, an audio generation device 618 (e.g., a sound card, an amplifier, a speaker, a headphone jack, or any suitable combination thereof), and a network interface device 620.

The storage unit 616 includes the machine-readable medium 622 (e.g., a tangible and non-transitory machine-readable storage medium) on which are stored the instructions 624 embodying any one or more of the methodologies or functions described herein, including, for example, any of the descriptions of FIGS. 1, 2, 3, 4, and/or 5. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media (e.g., tangible and non-transitory machine-readable media). The instructions 624 may be transmitted or received over a network 650 via the network interface device 620. For example, the network interface device 620 may communicate the instructions 624 using any one or more transfer protocols (e.g., hypertext transfer protocol (HTTP)). The machine 600 may also represent example means for performing any of the functions described herein, including the processes described in FIGS. 1, 2, 3, 4, and/or 5.

In some example embodiments, the machine 600 may be a portable computing device, such as a smart phone or tablet computer, and have one or more additional input components 630 (e.g., sensors or gauges). Examples of such input components 630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer implemented method for generating a backup of a database, the method comprising:
   marking a checkpoint in a log of the database;
   generating a backup of the database for data up to the checkpoint;
   recording first changes in the database while generating the backup of the database;
   adding to the backup of the database an additional backup of the recording of the first changes;
   recording second changes in the database while adding the additional backup;

determining if a number of second changes satisfies a criterion, the criterion comprising a configuration parameter representing a percentage size of the database; and if the number of second changes satisfies the criterion by exceeding a value of the configuration parameter, then adding to the backup of the database a backup of the recorded second changes.

2. The method of claim 1, further comprising:

until a number of a corresponding plurality of additional changes satisfies the criterion, recording the corresponding plurality of additional changes in the database while adding the additional backup;

determining if the number of corresponding plurality of additional changes satisfies the criterion; and if the number of corresponding plurality of additional changes satisfies the criterion, then adding to the backup of the database a backup of the recorded corresponding plurality of additional changes.

3. The method of claim 1, wherein generating a backup of the database utilizes a first database bitmap in an active state, and adding the additional backup of the recording of the first changes utilizes a second database bitmap in an active state.

4. The method of claim 3, further comprising switching the first database bitmap to an inactive state after generating the backup of the database.

5. The method of claim 4, further comprising switching the first database bitmap from the inactive state to the active state; and wherein adding to the backup of the database the backup of the recorded second changes utilizes the first database bitmap in the active state.

6. The method of claim 5, further comprising:

recording third changes in the database while adding to the backup of the database the backup of the recorded second changes, utilizing the second database bitmap;

determining if a number of third changes satisfies the criterion; and if the number of third changes satisfies the criterion, then adding to the backup of the database a backup of the recorded third changes, utilizing the second database bitmap.

7. A system comprising:

a first memory coupled to a first processor configured to execute a database server; and a second memory coupled to a second processor configured to execute a backup server;

wherein the database server is configured to:

mark a checkpoint in a log of the database;

generate a backup of the database for data up to the checkpoint;

record first changes in the database while generating the backup of the database;

add to the backup of the database an additional backup of the recording of the first changes;

record second changes in the database while adding the additional backup;

determine if a number of second changes satisfies a criterion, the criterion comprising a configuration parameter representing a percentage size of the database; and if the number of second changes satisfies the criterion by exceeding a value of the configuration parameter, then add to the backup of the database a backup of the recorded second changes.

8. The system of claim 7, wherein the database server is further configured to:

until a number of a corresponding plurality of additional changes satisfies the criterion, record the corresponding plurality of additional changes in the database while adding the additional backup;

determine if the number of corresponding plurality of additional changes satisfies the criterion; and if the number of corresponding plurality of additional changes satisfies the criterion, then add to the backup of the database a backup of the recorded corresponding plurality of additional changes.

9. The system of claim 7, wherein generating a backup of the database utilizes a first database bitmap in an active state, and adding the additional backup of the recording of the first changes utilizes a second database bitmap in an active state.

10. The system of claim 9, wherein the database server is further configured to switch the first database bitmap to an inactive state after generating the backup of the database.

11. The system of claim 10, wherein the database server is further configured to switch the first database bitmap from the inactive state to the active state; and wherein adding to the backup of the database the backup of the recorded second changes utilizes the first database bitmap in the active state.

12. The system of claim 11, wherein the database server is further configured to:

record third changes in the database while adding to the backup of the database the backup of the recorded second changes, utilizing the second database bitmap;

determine if a number of third changes satisfies the criterion; and if the number of third changes satisfies the criterion, then add to the backup of the database a backup of the recorded third changes, utilizing the second database bitmap.

13. A computer-readable medium embodying instructions that, when executed by a processor perform operations comprising:

marking a checkpoint in a log of the database;

generating a backup of the database for data up to the checkpoint;

recording first changes in the database while generating the backup of the database;

adding to the backup of the database an additional backup of the recording of the first changes;

recording second changes in the database while adding the additional backup;

determining if a number of second changes satisfies a criterion, the criterion comprising a configuration parameter representing a percentage size of the database; and if the number of second changes satisfies the criterion by exceeding a value of the configuration parameter, then adding to the backup of the database a backup of the recorded second changes.

14. The computer-readable medium of claim 13, wherein the operations further comprise:

until a number of a corresponding plurality of additional changes satisfies the criterion, recording the corresponding plurality of additional changes in the database while adding the additional backup;

determining if the number of corresponding plurality of additional changes satisfies the criterion; and if the number of corresponding plurality of additional changes satisfies the criterion, then adding to the backup of the database a backup of the recorded corresponding plurality of additional changes.

15. The computer-readable medium of claim 13, wherein generating a backup of the database utilizes a first database bitmap in an active state, and adding the additional backup of the recording of the first changes utilizes a second database bitmap in an active state.

16. The computer-readable medium of claim 15, wherein the operations further comprise switching the first database bitmap to an inactive state after generating the backup of the database.

17. The computer-readable medium of claim 16, wherein the operations further comprise switching the first database bitmap from the inactive state to the active state; and wherein adding to the backup of the database the backup of the recorded second changes utilizes the first database bitmap in the active state.

* * * * *